US005203284A

United States Patent [19]

Dietz

[11] Patent Number: 5,203,284

[45] Date of Patent: Apr. 20, 1993

[54] FLUIDIZED BED COMBUSTION SYSTEM UTILIZING IMPROVED CONNECTION BETWEEN THE REACTOR AND SEPARATOR

[75] Inventor: David H. Dietz, Hampton, N.J.

[73] Assignee: Foster Wheeler Development Corporation, Livingston, N.J.

[21] Appl. No.: 844,073

[22] Filed: Mar. 2, 1992

[51] Int. Cl.[5] ........................ B09B 3/00; F22B 1/00

[52] U.S. Cl. ........................ 122/4 D; 55/269; 110/216; 110/245; 122/6 A

[58] Field of Search ........................ 110/245, 263, 216; 122/4 D, 6 A; 55/269

[56] References Cited

U.S. PATENT DOCUMENTS 3,897,739 8/1975 Goldbach ........................ 110/216
4,394,849 7/1983 Pratt et al. .
4,469,050 9/1984 Korenberg .
4,475,472 10/1984 Adrian et al. .
4,615,715 10/1986 Seshamani .
4,651,653 3/1987 Anderson et al. .
4,708,092 11/1987 Engstrom .
4,732,113 3/1988 Engstrom .
4,746,337 5/1988 Magol et al. .
4,756,890 7/1988 Tang et al. .
4,813,479 3/1989 Wahlgren .
4,823,740 4/1989 Ohshita et al. .
4,880,450 11/1989 Magol et al. .
4,904,286 2/1990 Magol et al. .
4,932,363 6/1990 Kuivalainen .
4,934,281 6/1990 Engstrom et al. ........................ 110/216
4,944,250 7/1990 Seshamani .
4,951,611 8/1990 Abdulally .
4,969,930 11/1990 Arpalahti .
5,014,652 5/1991 Hyldgaard ........................ 122/4 D
5,078,100 1/1992 Huschauer et al. ........................ 122/4 D
5,094,191 3/1992 Garkawe et al. .

FOREIGN PATENT DOCUMENTS 2527478 5/1982 France .
54-91602 7/1979 Japan .
57-35857 2/1982 Japan .
437124 11/1984 Sweden .
709182 11/1977 U.S.S.R. .
567450 2/1946 United Kingdom .
587240 7/1947 United Kingdom .
641357 8/1950 United Kingdom .

*Primary Examiner*—Edward G. Favors

*Attorney, Agent, or Firm*—Marvin A. Naigur

[57] ABSTRACT

A fluidized bed combustion system in which a duct connects a reactor and a separator and extends within the furnace section of the reactor. The duct is wedge shaped, having an inlet width greater than its outlet width, and the bottom wall of the duct angles upwardly from the outer side wall of the duct. A portion of the duct extending within the furnace section is formed by cooling tubes which also form a portion of a side wall of the reactor, and a portion of the duct extending outside the furnace section is formed by cooling tubes which also form a portion of an outer wall of the separator. The portion of the duct extending within the furnace section is secured to the portion of the duct extending outside the furnace section to connect the reactor and separator without the use of expansion joints or seals.

25 Claims, 2 Drawing Sheets

FLUIDIZED BED COMBUSTION SYSTEM UTILIZING IMPROVED CONNECTION BETWEEN THE REACTOR AND SEPARATOR

BACKGROUND OF THE INVENTION

This invention relates to a fluidized bed combustion system and, more particularly, to such a system including a reactor connected to a separator in which a duct connecting the reactor and separator extends within the furnace section in the reactor.

Fluidized bed combustion systems in which reactors are used in connection with separators are well known. In these arrangements, a bed of particulate fuel, usually in the form of coal, wood or dehydrated sewage sludge, is provided in a furnace section of the reactor. Air is passed through the bed of particulate fuel to fluidize the bed in the furnace section, and thereby, effectuate high combustion efficiency at a relatively low temperature. This process, however, results in flue gases which entrain a large amount of fine particulates. The flue gases are therefore passed into a separator which separates the particulates from the flue gases and recycles the separated particulates back to the bed in the furnace section.

Fluidized bed combustion systems generally work well and have several advantages, such as permitting efficient fuel combustion and use while maintaining low emission levels for pollutants such as $NO_x$ and $SO_x$. However, these systems are not without problems. For example, separator efficiency and thermal stresses in the system require the use of complex and costly means for connecting the reactor with the separator, including the use of costly expansion joints and seals.

Additionally in conventional fluidized be combustion systems, the passage between the reactor and the separator is usually defined by a relatively expensive, high temperature, refractory-lined duct due to the extreme temperature of the flue gases. This duct is either made relatively thin due to the expense and weight of the refractory material which results in excessive heat losses to the environment, thereby reducing the system's efficiency, or it is made relatively thick which adds to the bulk, weight and cost of the separator. Even when the duct is thick, all the heat losses cannot be prevented since perfect insulation would raise the duct's temperature to an unacceptable degree.

A further problem associated with the use of a refractory-lined duct is the lengthy time required to warm the walls before putting the system on line to eliminate premature cracking of the refractory material. This lengthy delay is inconvenient and adds to the cost of the process.

SUMMARY OF THE INVENTION

It is therefore an object of the present invention to provide a fluidized bed combustion system of the above type in which the duct increases the efficiency of the separator and reduces the thermal stresses in the system so that the separator can be connected directly to the reactor without the need for costly expansion joints or seals.

It is a still further object of the present invention to provide a fluidized bed combustion system of the above type in which a duct is utilized to connect the reactor to the separator in a manner so that heat losses are reduced to increase the efficiency of the system.

It is a further object of the present invention to provide a fluidized bed combustion system of the above type in which expensive, high temperature, refractory-lined duct work is minimized.

It is a still further object of the present invention to provide a fluidized bed combustion system of the above type in which the steam generating system can be put into use relatively quickly without any significant warm up period.

Toward the fulfillment of these and other objects, the system of the present invention comprises a fluidized bed combustion system in which a duct is disposed between a reactor and a separator and extends within the furnace section of the reactor. The duct is wedge-shaped, having an inlet width greater than its outlet width, and a bottom wall which angles upwardly from the outer side wall of the duct. A first portion of the duct extending within the furnace section is formed by cooling tubes which also form the reactor walls, and a second portion of the duct extending outside the furnace section is formed by cooling tubes which also form a separator wall. The cooling tubes of the reactor walls which form the first portion of the duct are secured to the cooling tubes of the separator which form the second portion of the duct without the use of expansion joints or seals.

BRIEF DESCRIPTION OF THE DRAWINGS

The above brief description as well as further objects, features, and advantages of the present invention will be more fully appreciated by reference to the following detailed description of presently preferred but nonetheless illustrative embodiments in accordance with the present invention when taken in conjunction with the accompanying drawings wherein.

DESCRIPTION OF THE PREFERRED EMBODIMENT

Figure 1:
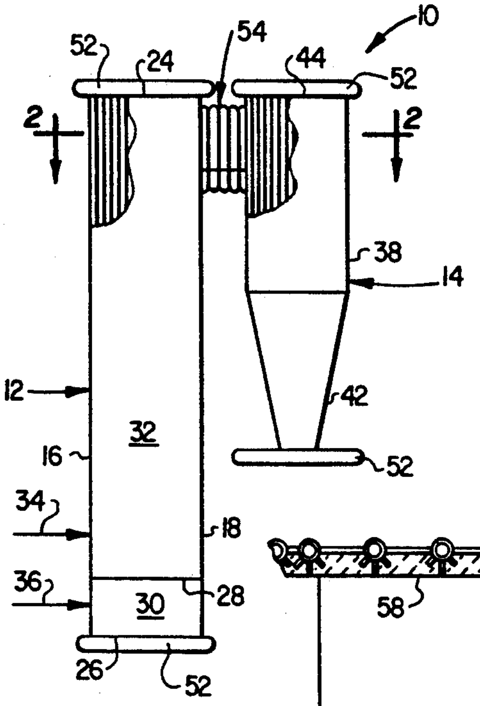
FIG. 1 is a schematic view of the fluidized bed combustion system of the present invention.
Figure 2:
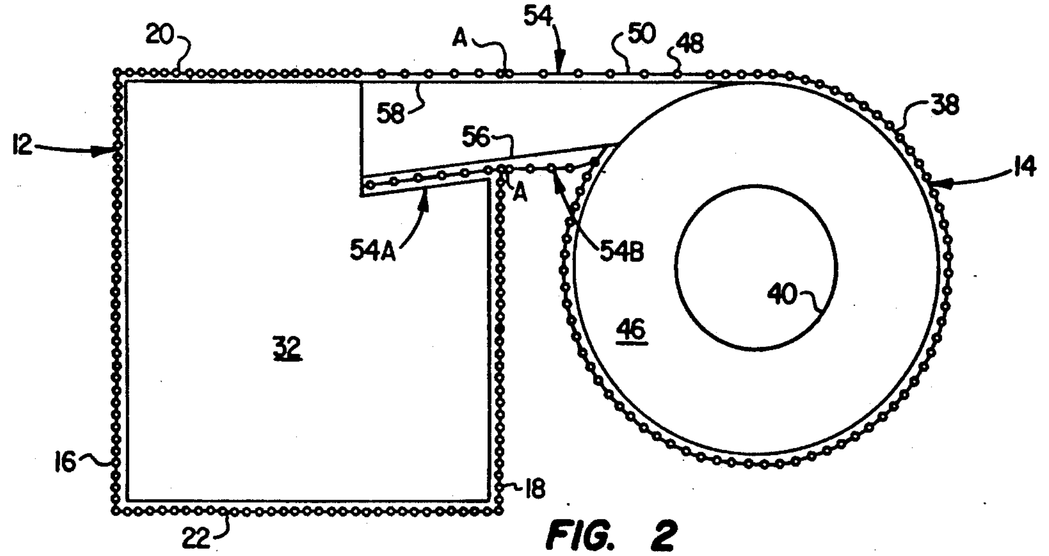
FIG. 2 is an enlarged cross-sectional view taken along the line 2—2 of FIG. 1.

Referring to FIGS. 1 and 2 of the drawings, the reference numeral 10 refers in general to a fluidized bed combustion system which includes a reactor or enclosure 12 and a separator 14. The reactor 12 has front and rear walls 16 and 18, respectively, side walls 20 and 22, a roof 24, and a floor 26. An air distributor plate 28 is suitably supported at a lower portion of the reactor 12 and divides the reactor into a plenum chamber 30 and a furnace section 32.

Solids, such as fuel and sorbent particles, are introduced into the furnace section 32 via an inlet 34. An additional inlet 36 introduces a pressurized oxygen-containing gas, such as air, from a suitable source (not shown), such as a forced-draft blower or the like, into the plenum 30 and through the distributor plate 28 to fluidize the solids in the furnace section 32 and support combustion of the fuel. Although not shown, conventional techniques are provided for combusting the fluidized fuel particles in the furnace section 32, and solids and oxygen-containing gas may be supplied in any conventional manner at more than one location and at more than one level.

The separator 14 is a cyclone separator having an outer cylinder 38, an inner cylinder or vortex tube 40 (FIG. 2), a hopper section 42 and a roof 44. The outer and inner cylinders 38 and 40, respectively, and the roof 44 form an annular chamber 46 for receiving and separating solids and gases, as described below. The hopper 42 may be connected to external equipment in any conventional manner or to the furnace 12 for recycling separated solids to the furnace section 32. Additionally, although reference is made to one separator 14, it is understood that one or more additional separators (not shown) may be connected to the reactor 12, and separators other than cyclone separators may also be used. The number, size, and type of separators used are determined by, among other things, the capacity of the combustion system and economical considerations.

Figure 4:
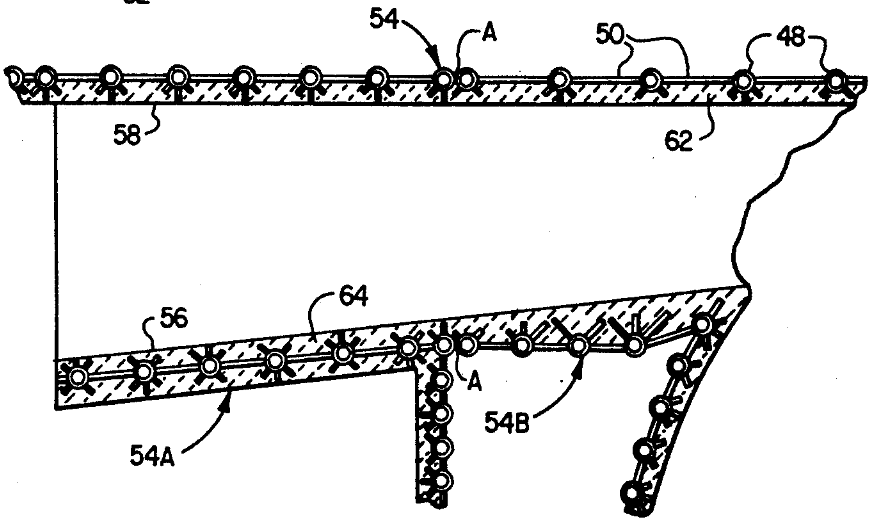
FIG. 4 is an enlarged, partial cross-sectional view of a portion of the duct of FIG. 2.

The walls of the reactor 12 and separator 14 are formed by cooling tubes 48 (FIG. 2) which extend vertically in a spaced, parallel relationship, and, as best shown in FIG. 4, a continuous fin 50 extends between corresponding portions of adjacent tubes 48 for their entire lengths to form gas tight walls. The fins 50 are secured between corresponding tubes 48 in any conventional fashion such as by welding.

A plurality of headers, a portion of which are shown by the reference numeral 52 in FIG. 1, are respectively disposed at the ends of the various walls described above. Although not shown in the drawings, conventional fluid flow circuitry is provided for circulating a cooling fluid, such as water or steam or a water and steam mixture, through the cooling tubes 48 which form the various walls. The fluid flow circuitry may take any conventional form and may, for example, utilize a steam drum and a plurality of downcomers and pipes along with connecting feeders, risers, headers, etc. (not shown) to establish a fluid flow circuit.

Figure 3:
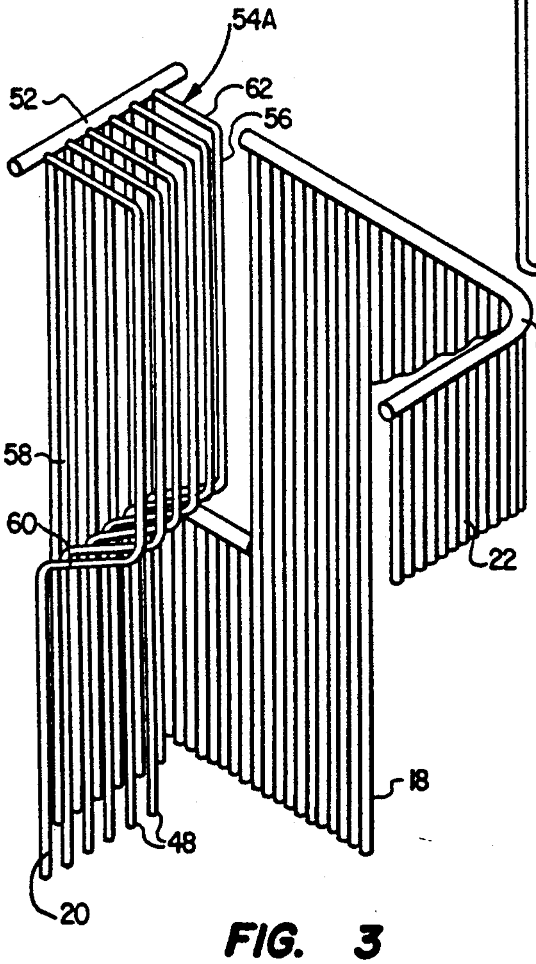
FIGS. 3 and 3A depict a perspective/schematic view of the system of FIG. 1 showing only the cooling tubes forming portions of the reactor, separator, and duct, with the reactor and the separator being depicted uncoupled for ease and clarity of presentation.
Figure 3A:
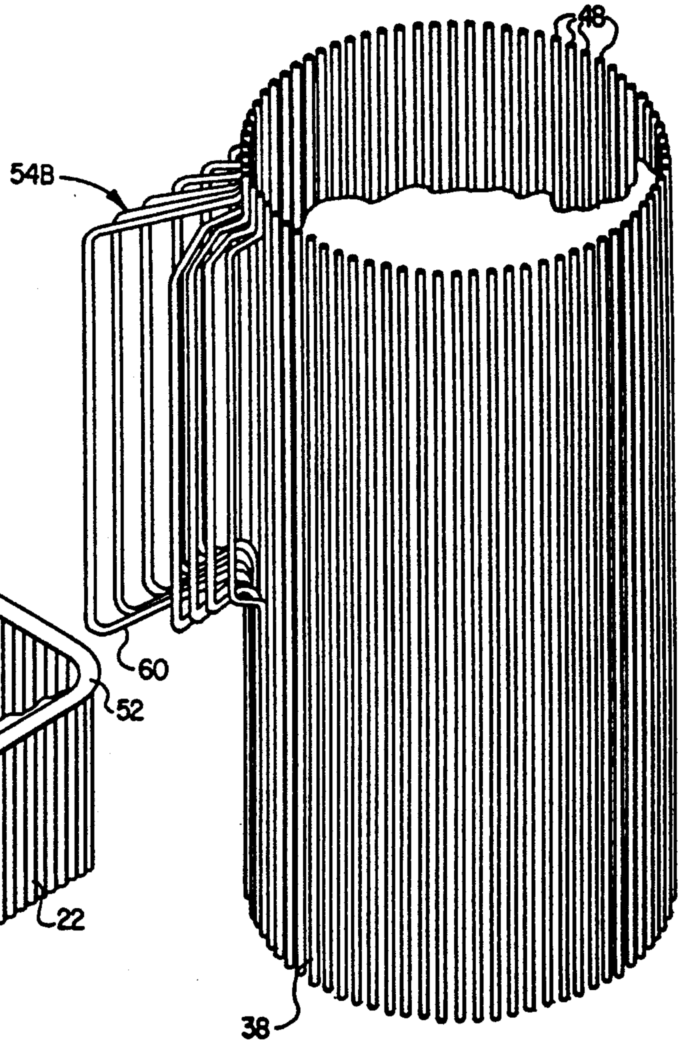

A duct 54 connects the upper portions of the reactor 12 and separator 14, and as best shown in FIG. 2, a portion 54A of the duct 54 extends within the furnace section 32, and an additional portion 54B of the duct 54 extends outside the furnace section 32. The duct 54 is formed by inner and outer side walls 56 and 58, respectively (FIGS. 2 and 4), and lower and upper walls 60 and 62, respectively (FIG. 3). The duct portions 54A and 54B both have inlets and outlets, and the side walls 56 and 58 are arranged to form a partial wedge as shown in FIGS. 2 and 4 such that the inlet of the duct portion 54A has a greater width than the outlet of the duct portion 54A, and the inlet of the duct portion 54B has a greater width than the outlet of the duct portion 54B. (It is understood that the outlet width of the duct portion 54B is measured along a line extending perpendicular to the outer side wall 58 and intersecting the inner side wall 56 at its outlet end.)

The inlet of the duct portion 54 is in fluid flow communication with the furnace section 32, and the outlet of the duct portion 54B is in fluid flow communication with the annular chamber 46 of the separator 14. The outlet of the duct portion 54A is connected by any conventional means, such as by welding, directly to the inlet of the duct portion 54B along an area A shown in FIGS. 2 and 4. Therefore, the duct portions 54A and 54B form a unitary gas tight structure for directing solids and gases from the furnace section 32 to the annular chamber 46 of the separator 14. As shown in FIG. 3, the lower wall 60 of the duct portion 54A and the duct portion 54B preferably forms an acute angle with the outer side wall 58 of the duct portions 54A and 54B which angle is preferably approximately 30°.

The walls of the duct 54 are also formed by cooling tubes 48 which are connected by continuous fins 50. As shown in FIGS. 2–4, the duct portion 54A extends within the furnace section 32 and is formed by a portion of the cooling tubes 48 which also form the side wall 20 of the reactor 12. As best shown in FIG. 3, at an upper, rear portion of the reactor side wall 20, every other cooling tube 48 of the side wall 20 is bent first inwardly from the plane of the side wall 20 to form the lower wall 60 of the duct 54 and then upwardly to form the inner side wall 56 of the duct. A portion of the tubes 48 of the side wall 20 that are not bent in the foregoing manner remain vertical and form the outer side wall 58 of the duct. The upper wall 62 of the duct portion 54A which extends within the furnace section 32 is preferably formed by a portion of the reactor roof 24 but may also be formed in other ways such as by bending a portion of the cooling tubes forming the inner duct wall 56 back to the plane of the reactor side wall 20, as shown in FIG. 3.

As shown in FIGS. 2–4, the duct portion 54B is formed from the cooling tubes 48 of the separator 14. This is achieved by bending a portion of the tubes 48 forming the outer cylinder 38 of the separator from the plane of the cylinder wall.

The inner surfaces of the duct 54 are lined with refractory 64 (FIG. 4) to prevent premature erosion of the duct surfaces. Additionally, the inner side wall 56 and lower wall 60 of the duct portion 54A, which extend within the furnace section 32, both have refractory 64 along both inner and outer surfaces.

In operation, fuels are combusted in the furnace section 32, and fluidizing air is provided to the furnace section 32 to support combustion of the fuel and to fluidize the material in the furnace section. The mixture of fluidizing air and entrained gaseous products of combustion (referred to generally as "flue gases") passes upwardly through the furnace section 32 by natural convection, entraining solids, such as fuel and sorbent particles and solid products of combustion, and at least a portion of these pass through the duct 54, and into the annular chamber 46 of the separator 14.

By extending the duct 54 within the furnace section 32, the flue gases and entrained solids are forced to make a turn into the duct inlet. As the flue gases and entrained solids make this turn into the duct 54, the heavier entrained solids begin to separate from the flue gases and begin moving toward the outer side wall 58 of the duct. The duct 54 therefore acts as a extension of the separator 14 and accordingly increases the separator efficiency.

The wedge shape of the duct 54 provides for streamlining of the fluid flow, and the relatively narrow duct outlet tends to give better separator efficiencies and also serves to protect the inner cylinder 40 of the separator 14 from premature erosion due to the high solids throughput of the fluidized bed. Additionally, the angled lower wall 60 of the duct 54 provides for further streamlining of fluid flow and also acts to move the solids in the flue gases toward the outer side wall 58 of the duct, thereby increasing the separator efficiency.

Several other advantages result from the foregoing arrangement. For example, heat losses are reduced to minimize the requirement for internal refractory insulation. Also, the need for expensive, high temperature, refractory-lined duct work is minimized. Additionally, the fluidized bed combustor can be put into use relatively quickly without any significant warm-up period. Further still, the efficiency of the separator 14 is increased which reduces the thermal stresses in the system so that the separator can be connected directly to the furnace 12 without the need for costly expansion joints or seals.

It is understood that several variations may be made in the foregoing without departing from the scope of the present invention. For example, although preferred, the duct 54 need not be formed by cooling tubes 48. Additionally, the lower wall 60 and inner side wall 56 of the portion 54A of the duct 54 extending within the furnace section 32 need not be formed by bending cooling tubes 48 from the plane of the furnace side wall 20. Also, the upper wall 62 of the portion of the duct 54A extending within the furnace section 32 need not be formed by a portion of the reactor roof 24 but may also be formed in other ways such as by bending a portion of the cooling tubes forming the inner duct wall 56 back to the plane of the reactor side wall 20. Further, although preferred, the duct 54 need not be wedge-shaped, and the bottom wall 60 of the duct need not extend at an acute angle from the outer side wall 58 of the duct. Further still, although generally unnecessary, expansion joints may be used in connecting the reactor 12 and separator 14.

Other modifications, changes, and substitutions are intended in the foregoing disclosure and although the invention has been described with reference to a specific embodiment, the foregoing description is not intended to be construed in a limiting sense. Various modifications to the disclosed embodiment as well as alternative applications of the invention will be suggested to persons skilled in the art by the foregoing specification and illustrations. Accordingly, it is appropriate that the appended claims be construed broadly and in a manner consistent with the true scope of the invention therein.

What is claimed:

1. A fluidized bed combustion system comprising:

(a) a reactor having a furnace section;

(b) means for introducing fuel particles into said furnace section;

(c) means for combusting said fuel particles to form gaseous and solid products of combustion;

(d) means for fluidizing said furnace section with a fluidizing gas so that said fluidizing gas combines with said gaseous products of combustion to form flue gases which entrain portions of said fuel particles and said solid products of combustion;

(e) a separator for receiving and separating said flue gases and said entrained material; and (f) a duct connecting said reactor to said separator for passing said flue gases and said entrained material from said furnace section to said separator, at least a portion of said duct extending within said furnace section, said duct having an inlet for receiving said flue gases and entrained material from said furnace section and an outlet for passing said flue gases and entrained material to said separator, and said duct being wedge shaped so that said inlet has a greater width than said outlet.

2. The system of claim 1 wherein said duct has an outer side wall and a bottom wall, and said bottom wall extends upwardly from said outer side wall at an acute angle.

3. The system of claim 2 wherein said acute angle is approximately 30°.

4. A fluidized bed combustion system comprising:

(a) a reactor having a furnace section;

(b) means for introducing fuel particles into said furnace section;

(c) means for combusting said fuel particles to form gaseous and solid products of combustion;

(d) means for fluidizing said furnace section with a fluidizing gas so that said fluidizing gas combines with said gaseous products of combustion to form flue gases which entrain portions of said fuel particles and said solid products of combustion;

(e) a separator for receiving and separating said flue gases and said entrained material;

(f) a duct connecting said reactor to said separator for passing said flue gases and said entrained material from said furnace section to said separator, at least a portion of said duct extending within said furnace section; and (g) wherein said reactor has a side wall and a roof formed by cooling tubes, said duct portion having an inner and an outer side wall and a top and a bottom wall, said bottom wall being formed by bending a portion of said cooling tubes of said reactor side wall from the plane of said reactor side wall and into said furnace section, and said inner side wall of said duct portion being formed by bending a portion of said cooling tubes which form said bottom wall of said first duct portion upwardly to said roof of said reactor.

5. The system of claim 4 wherein said duct has an additional duct portion extending outside of said furnace section and between said reactor and said separator, said additional duct portion being formed by cooling tubes.

6. The system of claim 5 wherein said additional duct portion has an inner and an outer side wall and a top and a bottom wall, and each of said walls of said duct portion and said additional duct portion have inner surfaces, and further comprising a refractory material affixed to said inner surfaces of each of said walls of said duct portion and said additional duct portion.

7. The system of claim 4 wherein said separator has an outer wall formed by cooling tubes, and said duct has an additional duct portion that extends outside of said furnace section and between said reactor and said separator, said additional duct portion being formed by portions of said cooling tubes which form said outer wall of said separator.

8. The system of claim 5 wherein said separator is a cyclone separator.

9. The system of claim 5 wherein said duct portion extending within said furnace section has an inlet and an outlet and is wedge shaped so that said inlet has a greater width than said outlet.

10. The system of claim 9 wherein said additional duct portion has an inlet and an outlet and is wedge shaped so that said latter inlet has a greater width than said latter outlet, said latter inlet being secured to said outlet of said duct portion extending within said furnace section.

11. The system of claim 10 wherein said additional duct portion has an outer side wall and a bottom wall, and said bottom wall of said duct portion extending within said furnace section extends upwardly from said outer side wall of said latter duct portion at an acute angle, and said bottom wall of said additional duct portion extends upwardly from said outer side wall of said additional duct portion at said acute angle.

12. The system of claim 11 wherein said acute angle is approximately 30°.

13. A duct for connecting a reactor having a furnace section to a separator, comprising:

(a) a first duct portion having an inlet and an outlet, at least a portion of said first duct portion extending within said furnace section of said reactor, said reactor having a side wall and a roof formed by cooling tubes, said first duct portion having a bottom wall formed by a portion of said cooling tubes which form said reactor side wall, said portion of said cooling tubes which form said reactor side wall being bent from the plane of said reactor side wall and into said furnace section to form said bottom wall, and said first duct portion having an inner side wall formed by a portion of said cooling tubes which form said bottom wall of said first duct portion, said portion of said cooling tubes which form said bottom wall of said first duct portion being bent upwardly within said furnace section to said reactor roof to form said inner side wall; and (b) a second duct portion having an inlet and an outlet, said inlet of said second duct portion being secured to said outlet of said first duct portion and said outlet of said second duct portion being secured to said separator, thereby placing said furnace section in fluid flow communication with said separator.

14. The duct of claim 13 wherein said first duct portion has a top wall formed by a portion of said cooling tubes which form said reactor roof, and wherein said first duct portion has an outer side wall formed by a portion of said cooling tubes which form said reactor side wall and which extend in the plane of said reactor side wall.

15. The duct of claim 13 wherein said second duct portion is formed by cooling tubes.

16. The duct of claim 15 wherein said separator has an outer wall formed by cooling tubes, and said second duct portion is formed by portions of said cooling tubes which form said outer wall of said separator.

17. The duct of claim 15 wherein said outlet of said first duct portion is secured to said inlet of said second duct portion without the use of expansion joints or seals.

18. The duct of claim 17 wherein said outlet of said first duct portion is secured to said inlet of said second duct portion by welding.

19. The duct of claim 15 wherein said first duct portion is wedge shaped so that said inlet of said first duct portion has a greater width than said outlet of said first duct portion.

20. The duct of claim 19 wherein said second duct portion is wedge shaped so that said inlet of said second duct portion has a greater width than said outlet of said second duct portion.

21. The duct of claim 20 wherein said first duct portion has an outer side wall, and said second duct portion has an outer side wall and a bottom wall, said bottom wall of said first duct portion extending upwardly from said outer side wall of said first duct portion at an acute angle, and said bottom wall of said second duct portion extending upwardly from said outer side wall of said second duct portion at said acute angle.

22. The duct of claim 21 wherein said acute angle is approximately 30°.

23. The duct of claim 20 wherein said first duct portion has a top wall and an outer side wall, and said second duct portion has an inner and an outer side wall and a top and a bottom wall, each of said walls of said first duct portion and said second duct portion having inner surfaces, and further comprising a refractory material affixed to said inner surfaces of each of said walls of said first duct portion and said second duct portion.

24. A duct for connecting a reactor having a furnace section to a separator, at least a portion of walls forming said reactor and said separator being formed by a plurality of cooling tubes, said duct comprising:

(a) a first duct portion formed at least in part by a portion of said cooling tubes forming said reactor, said first duct portion having an inlet end and an outlet end and at least a portion of said first duct portion extending within said furnace section;

(b) a second duct portion formed at least in part by a portion of said cooling tubes forming said separator, said second duct portion having an inlet end and an outlet end; and (c) means connecting said inlet end of said second duct portion to said outlet end of said first duct portion to place said furnace section in fluid flow communication with said separator.

25. The duct of claim 24 wherein said inlet end of said second duct portion is directly welded to said outlet end of said first duct portion.

* * * * *

UNITED STATES PATENT AND TRADEMARK OFFICE
CERTIFICATE OF CORRECTION

PATENT NO. : 5,203,284

DATED : April 20, 1993

INVENTOR(S) : David H. Dietz

It is certified that error appears in the above-identified patent and that said Letters Patent is hereby corrected as shown below:

Column 3, line 58, change "54" to -- 54A --.

Signed and Sealed this

Fourth Day of January, 1994

*Attest:*

Bruce Lehman

BRUCE LEHMAN

*Attesting Officer*

*Commissioner of Patents and Trademarks*